(12) United States Patent
Gulick, Jr. et al.

(10) Patent No.: US 12,152,412 B2
(45) Date of Patent: Nov. 26, 2024

(54) SECURITY ELEMENT AND ASSOCIATED SECURITY SYSTEM

(71) Applicant: Scorpion Security Products, Inc., Vestal, NY (US)

(72) Inventors: Franklyn W. Gulick, Jr., Vestal, NY (US); Gary R. Page, Chenango Forks, NY (US); Andrew Bartoszewski, Syracuse, NY (US)

(73) Assignee: SCORPION SECURITY PRODUCTS, INC., Vestal, NY (US)

( * ) Notice: Subject to any disclaimer, the term of this patent is extended or adjusted under 35 U.S.C. 154(b) by 961 days.

(21) Appl. No.: 17/059,621

(22) PCT Filed: Jun. 25, 2019

(86) PCT No.: PCT/US2019/038906
§ 371 (c)(1),
(2) Date: Nov. 30, 2020

(87) PCT Pub. No.: WO2020/005886
PCT Pub. Date: Jan. 2, 2020

(65) Prior Publication Data
US 2021/0262499 A1 Aug. 26, 2021

Related U.S. Application Data

(60) Provisional application No. 62/689,425, filed on Jun. 25, 2018, provisional application No. 62/744,843, filed on Oct. 12, 2018.

(51) Int. Cl.
*E05B 73/00* (2006.01)
(52) U.S. Cl.
CPC ............. *E05B 73/00* (2013.01); *Y10T 70/411* (2015.04)

(58) Field of Classification Search
CPC .. E05B 73/00; E05B 73/0005; E05B 73/0017; E05B 73/0041; E05B 73/02;
(Continued)

(56) References Cited

U.S. PATENT DOCUMENTS 1,577,155 A * 3/1926 Anderson ................. B25B 7/10
81/412
2,469,592 A * 5/1949 Byer ..................... G09F 3/0352
292/307 R
(Continued)

OTHER PUBLICATIONS

International Searching Authority, International Search Report and the Written Opinion, date of mailing Sep. 13, 2019, (8 pages).
(Continued)

*Primary Examiner* — Alyson M Merlino
(74) *Attorney, Agent, or Firm* — Barclay Damon LLP

(57) ABSTRACT

A security element comprises a fixed member comprising a clamping portion proximate a first end and a coupling portion proximate the second end and defining a slot extending along a slot axis. The slot comprises an interior surface comprising a plurality of recesses. An adjustable member comprises an engagement portion configured to house a portion of the coupling portion of the fixed member. A coupling element is configured to extend between a first coupling opening and a second coupling opening and is configured to couple the adjustable member to the fixed member through the slot, wherein the coupling element is configured to contact at least one of the plurality of recesses in the slot. A barrier is formed between adjacent recesses that is configured to prevent the coupling element from moving along the slot axis.

19 Claims, 16 Drawing Sheets

(58) Field of Classification Search
CPC .... E05B 73/0094; E05B 73/007; E05C 19/18;
E05C 19/186; E05C 19/188; Y10T 70/40;
Y10T 70/411; Y10T 70/402; Y10T
70/404; Y10T 70/407; Y10T 70/409;
Y10T 292/20; Y10T 292/221; Y10T
292/223; Y10T 292/228; Y10T 292/123;
Y10T 292/237; Y10T 292/34; Y10T
292/37; Y10T 292/379; Y10T 292/382;
Y10T 292/385; Y10T 292/388; B25B
7/10; B25B 7/12; B25B 5/082
USPC ... 248/229.12, 229.22, 228.3, 230.3, 231.41,
248/316.4
See application file for complete search history.

(56) References Cited

U.S. PATENT DOCUMENTS

| | | | | |
|---|---|---|---|---|
| 3,091,011 A * | 5/1963 | Campbell | ............ | A63C 11/006 24/527 |
| 4,581,960 A * | 4/1986 | Putsch | ............ | B25B 7/10 81/394 |
| 5,461,951 A * | 10/1995 | Putsch | ............ | B25B 7/10 81/394 |
| 6,263,709 B1 * | 7/2001 | Kemery | ............ | A63C 11/006 70/58 |
| 6,742,366 B1 * | 6/2004 | Lai | ............ | E05B 67/003 70/30 |
| 6,892,609 B2 * | 5/2005 | Kuo | ............ | B25B 7/10 81/413 |
| 7,299,668 B1 * | 11/2007 | Lu | ............ | E05B 73/0082 70/57 |
| 7,614,324 B2 * | 11/2009 | Bocquet | ............ | B25B 7/10 81/355 |
| 9,115,513 B1 | 8/2015 | Cayouette | | |
| 2004/0221694 A1 | 11/2004 | Kuo | | |
| 2009/0266119 A1 | 10/2009 | Brojanac et al. | | |
| 2009/0266963 A1 * | 10/2009 | Marszalek | ............ | E05B 73/0082 248/316.1 |
| 2014/0053694 A1 * | 2/2014 | Lin Wu | ............ | B25B 7/10 81/416 |
| 2015/0305518 A1 | 10/2015 | Galant | | |

OTHER PUBLICATIONS

International Bureau, International Preliminary Report on Patentability, date of issuance Dec. 29, 2020, (7 pages).

* cited by examiner

SECURITY ELEMENT AND ASSOCIATED SECURITY SYSTEM

CROSS-REFERENCE TO RELATED APPLICATIONS

This application claims the benefit and priority of U.S. Patent Application No. 62/689,425, filed Jun. 25, 2018, and entitled, MULTI-USE SECURITY ELEMENT AND ASSOCIATED APPARATUS, and of U.S. patent application No. 62/744,843, filed Oct. 12, 2018, and entitled MULTI-USE SECURITY ELEMENT AND ASSOCIATED APPARATUS, the entirety of which are incorporated herein by reference.

TECHNOLOGICAL FIELD

This disclosure relates to security devices and associated systems, and specifically to a security system with a security element that is easily locked and unlocked with minimal use of tools, and which allows for the functional and secure display of objects of many different sizes and proportions.

BACKGROUND

As more and more retail business is conducted over the Internet, brick-and-mortar retail outlets continue to work on improving the customer experience in order to maintain or even increase their market share. Part of the customer experience continues to be the ability to touch, hold, and even test merchandise retail locations before making a purchase. Accordingly, retailers face the challenge of fitting their merchandise with security apparatuses that are capable of providing a high level of security to deter and prevent theft while being unobtrusive enough so as to enable the customer to interact with and have a positive experience with the merchandise.

Currently there are security apparatuses and systems for portable electronic devices that secure said device to a display surface while allowing the customer to have access to the touchscreen, keypad, or other features of the electronic device. Some of these security apparatuses even allow the customer to pick up the electronic device while keeping it securely tethered to an anchor in order to prevent theft. However, such security apparatuses are specifically designed to work with the relatively small portable electronic devices such as Smart Phones, tablets, and laptop computers and are unable to be used to secure other merchandise that require the same freedom to touch and test.

Merchandise, such as power tools, televisions, yard equipment, and sports equipment are too large and improperly proportioned to be used with the existing range of security apparatuses used for portable electronic devices. Likewise, small items such as jewelry, fashion accessories, and the like are too small and improperly proportioned to be used with the current range of security apparatuses used for portable electronics. Some of the current security apparatuses used with such larger merchandise typically include security tags that communicate with a sensor located within the retail space, which produces an alarm when the security tag passes beyond the sensor boundary. Other security apparatuses for larger merchandise include fixed displays where the merchandise is locked in place, which severely limits or even prevents holding or testing the merchandise. In other retail environments, larger merchandise may be held in locked display units, which could make them completely inaccessible to customers. Moreover, such display units require an employee of the retailer to unlock or otherwise access the unit in order to remove merchandise of interest in order to provide the customer with the opportunity to conduct a closer and more thorough examination prior to purchase.

These are just some of the problems associated with current security apparatuses and associated systems used to secure retail merchandise.

SUMMARY

An embodiment of a security element comprises a fixed member having a first end and a second end. The fixed member comprises a clamping portion proximate the first end that comprises a fixed engagement surface, and a coupling portion proximate the second end. The coupling portion defines a slot extending along a slot axis, wherein the slot comprises an interior surface comprising a plurality of adjacent recesses. An adjustable member with a first and second end comprises a securing portion proximate the first end that comprises an adjustable engagement surface. The clamping portion and the securing portion are configured to face each other. An engagement portion is proximate the second end and is configured to house a portion of the coupling portion of the fixed member. The engagement portion further defines a first opening and a second opening. A coupling element is configured to extend between the first opening and the second opening and through the slot in order to couple the adjustable member to the fixed member. The coupling element is configured to contact at least one of the plurality of recesses of the interior surface of the slot. A barrier is formed between adjacent recesses that is configured to prevent the coupling element from moving along the slot axis and a backing is configured to prevent removal of the coupling element from the first opening, second opening, and the slot.

In an embodiment, the security element comprises a fixed member having a first end and a second end. The fixed member comprises a clamping portion that is proximate the first end and comprises a fixed clamping surface. A coupling portion is proximate the second end and defines a slot extending along a slot axis. The slot comprises an interior surface comprising a plurality of adjacent recesses. An adjustable member having a first end and a second end comprises a securing portion proximate the first end and comprising an adjustable clamping surface, and an engagement portion proximate the second end. The engagement portion is configured to house a portion of the coupling portion of the fixed member. The engagement portion further defines a first coupling opening and a second coupling opening. A coupling element is configured to extend between the first coupling opening, the second coupling opening, and the slot, wherein the coupling element is further configured to be positioned within at least one recess of the interior surface of the slot.

An embodiment of a security system comprises a security member coupled to an anchor. The security member comprises a fixed member defining a fixed clamping surface at a first end and a second end defining an opening with an interior surface comprising a plurality of recesses. An adjustable member defines an adjustable clamping surface at a first end and a bore at a second end, wherein the second end of the fixed member is configured to be at least partially inserted into the bore of the adjustable member. A coupling element is configured to traverse the second end of the adjustable member and the opening of the fixed member in order to couple the fixed member to the adjustable member, wherein the coupling element is configured to contact at least one of the plurality of recesses. The anchor is configured to couple the coupling element to a fixed structure. An unlocked state is defined when the adjustable member is able to move relative to the fixed member, and a locked state is defined when the adjustable member is prevented from moving relative to the fixed member.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

Figure 1:
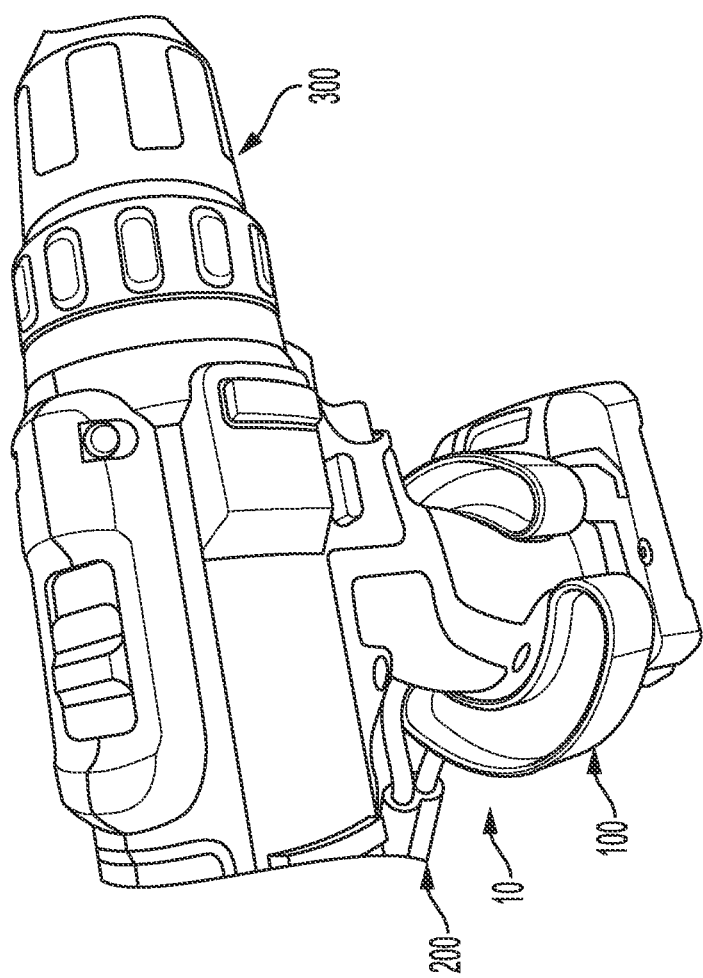
FIG. 1 illustrates a perspective view of an embodiment of a security system securing a power tool.

The following detailed description refers to the accompanying drawings. Whenever possible, the same reference numbers are used in the drawings and the following description to refer to the same or similar elements. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the security element and associated security system and are not specifically provided to scale.

Referring generally to FIG. 1, a security system 10 comprises a security element 100 coupled to an anchor 200 or tether. The anchor 200 is configured to keep the security element 100 within a display area that is determined by the length of the anchor 200. The security element 100 is configured to at least partially surround and trap a portion of an object 300, and the anchor 200 is configured to prevent the security element 100 and the secured object 300, such as a power tool, from being removed from the display area.

Figure 2:
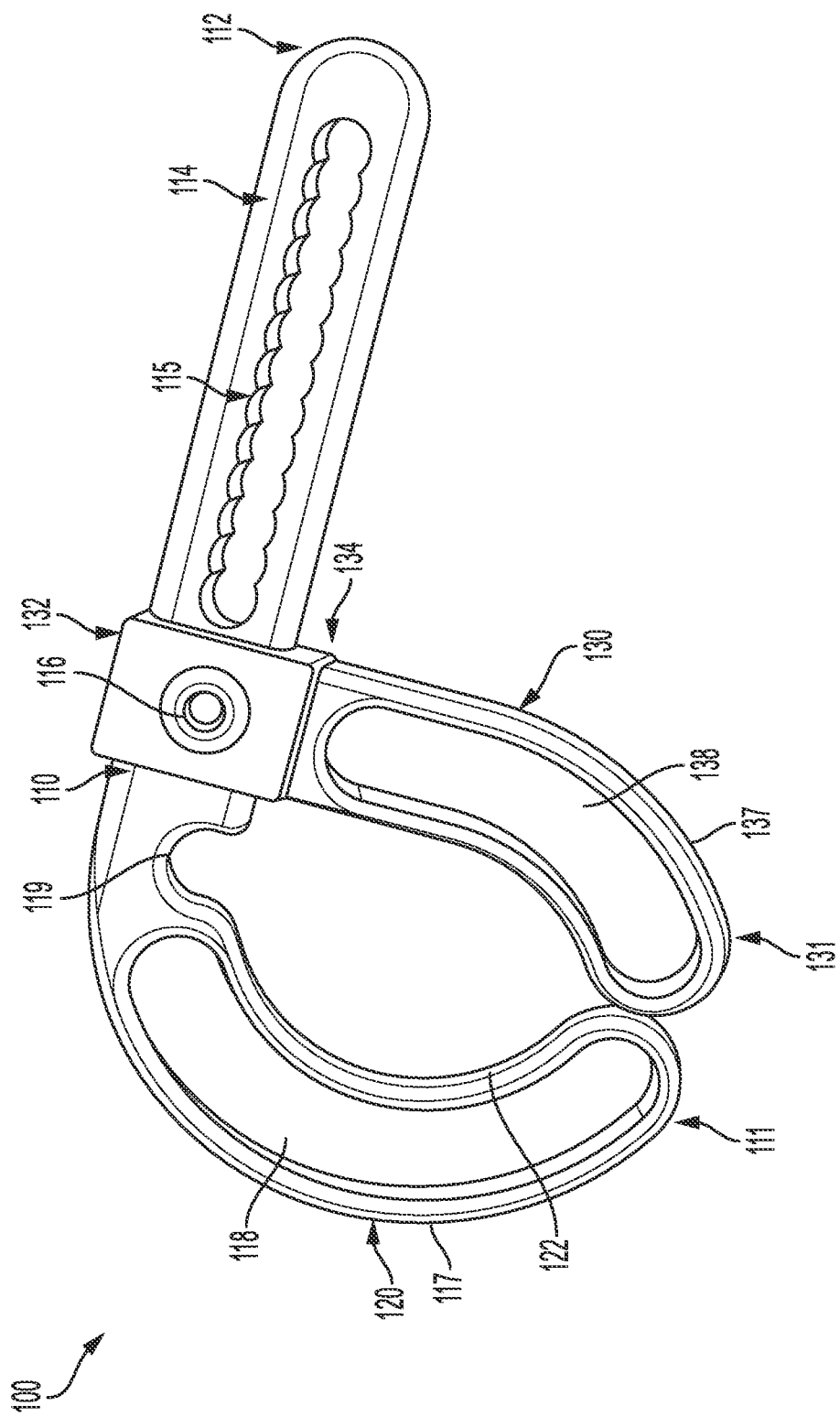
FIG. 2 illustrates a plan view of an embodiment of a security element of the security system.
Figure 3:
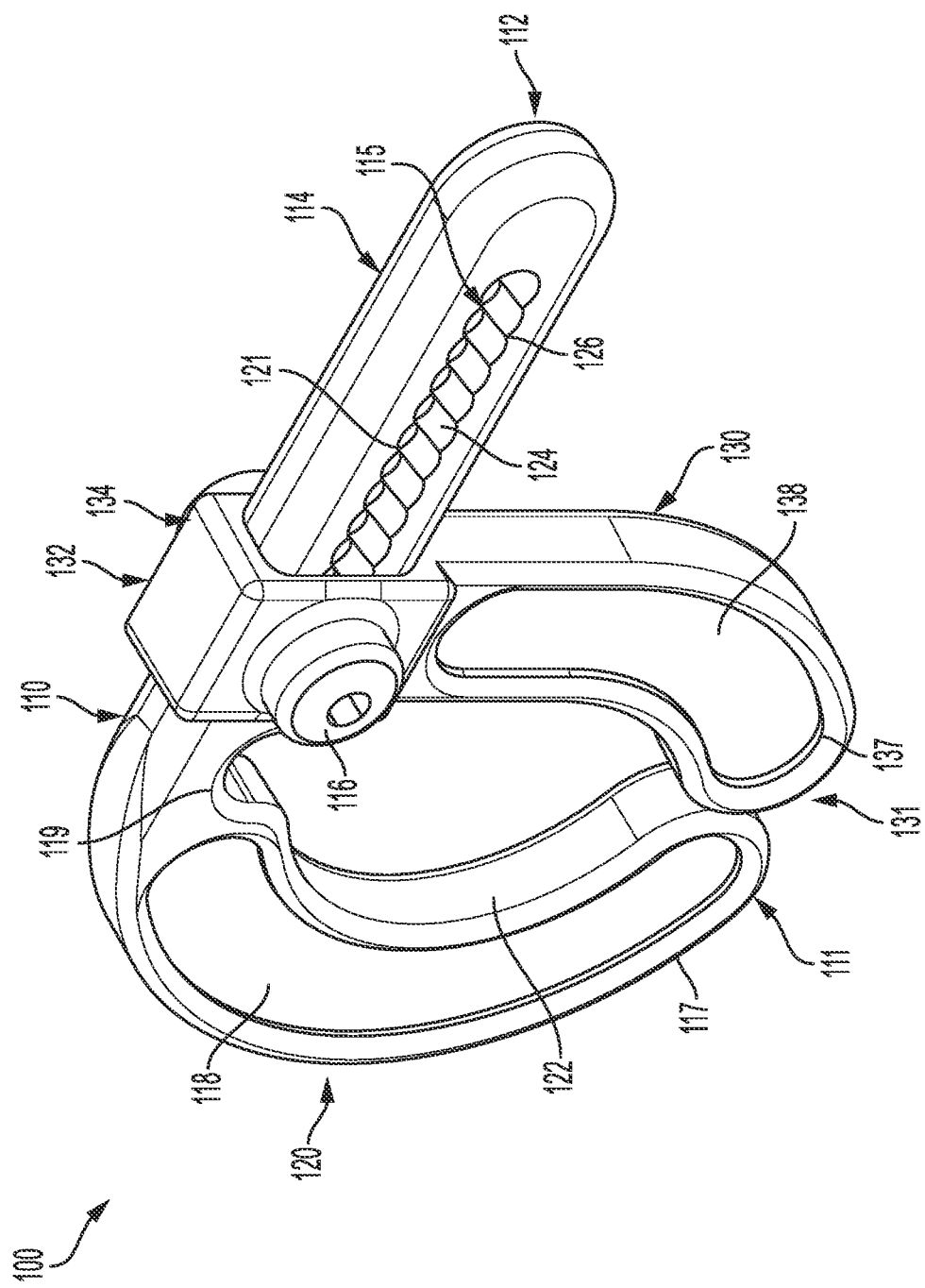
FIG. 3 illustrates a perspective view of an embodiment of the security element of the security system.
Figure 4:
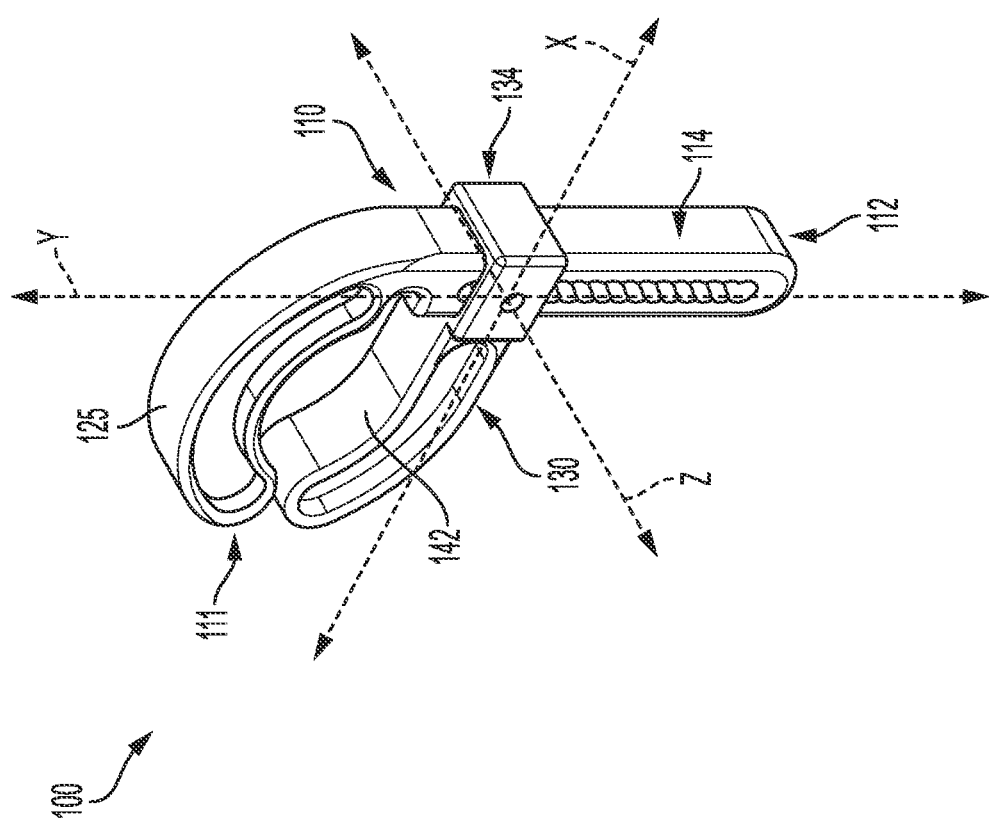
FIG. 4 illustrates a perspective view of an embodiment of the security element of the security system.
Figure 5B:
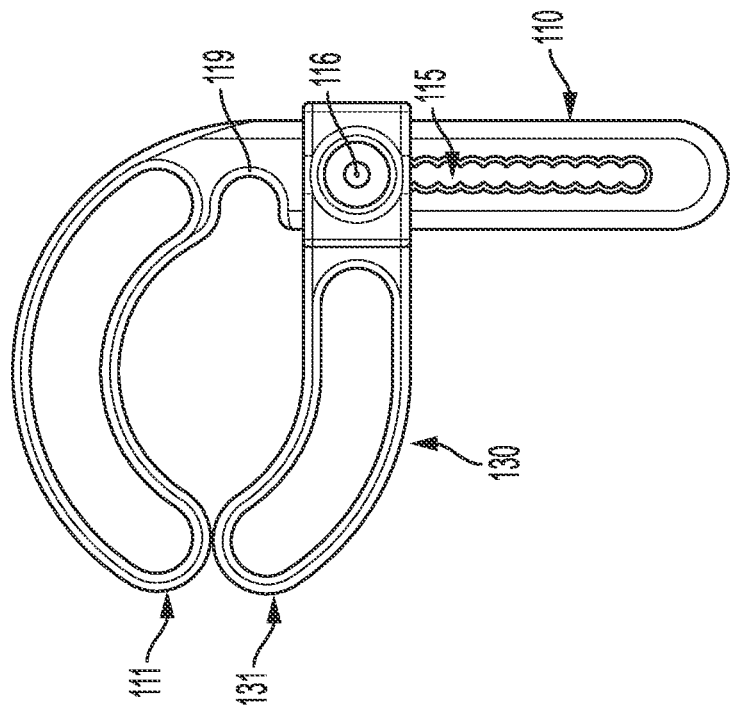
FIG. 5B illustrates a plan view of an embodiment of the security element of the security system in an expanded position.
Figure 5A:
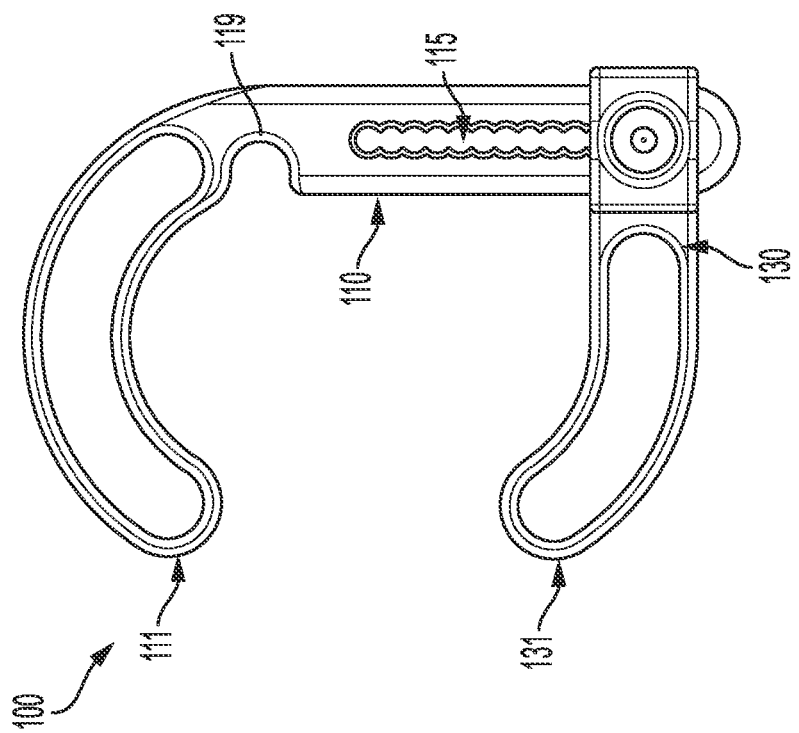
FIG. 5A illustrates a plan view of an embodiment of the security element of the security system in a fully expanded position.

As shown in FIGS. 2-4, the security element generally comprises a fixed member 110 that is coupled to a moveable or adjustable member 130 via a coupling element 116. The adjustable member 130 is configured to adjustably engage with the fixed member 110 and move in relation to the fixed member 110. In an embodiment, the coupling element 116 is configured couple the adjustable member 130 to the fixed member 110 while still allowing the adjustable member 130 to move relative to the fixed member 110. The coupling element 116 is further configured to fixedly couple or lock the adjustable member 130 such that it is unable to move relative to the fixed member 110. In another embodiment, the insertion of the coupling element 116 prevents the movement of the adjustable member 130 relative to the fixed member 110.

The fixed member 110 comprises a first end 111 and a second end 112. A clamping or grasping portion 120 is positioned proximate the first end 111 and further comprises a fixed clamping surface 122 or a fixed engagement surface. As shown, the fixed clamping surface 122 is smooth, however in other embodiments the fixed clamping surface 122 may include one or more surface features configured to improve gripping properties when the security element 100 is installed onto a piece of merchandise or other object 300. In still another embodiment, the fixed clamping surface 122 may be at least partially coated with or otherwise covered with a material such as silicone, polyurethane gel, rubber, foam, or any other suitable material configured to improve the gripping properties while protecting the object being secured from damage by the security element 100.

Figure 7:
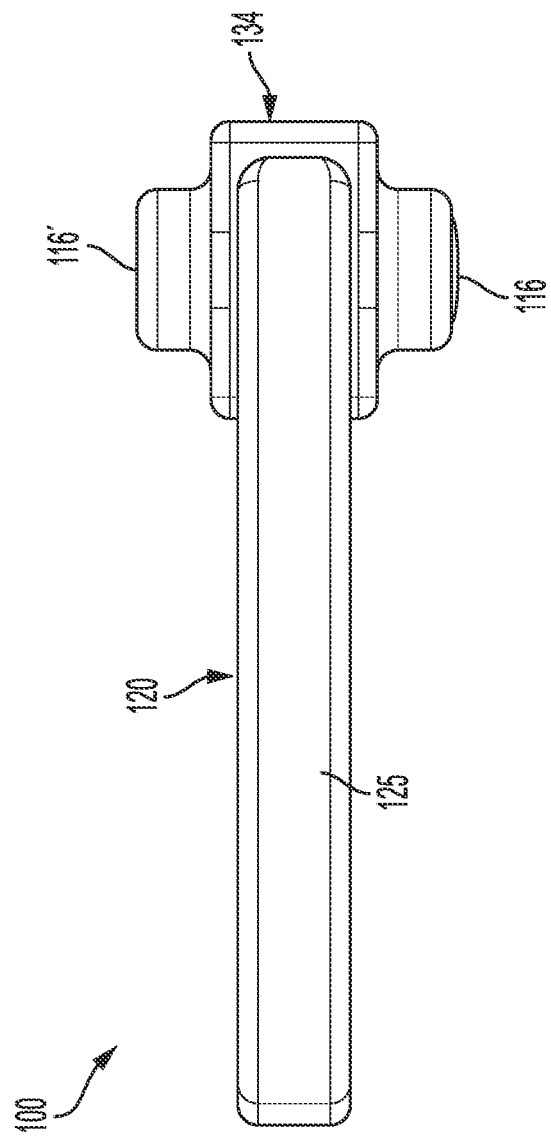
FIG. 7 illustrates a top plan view of another embodiment of the security element of the security system.
Figure 8:
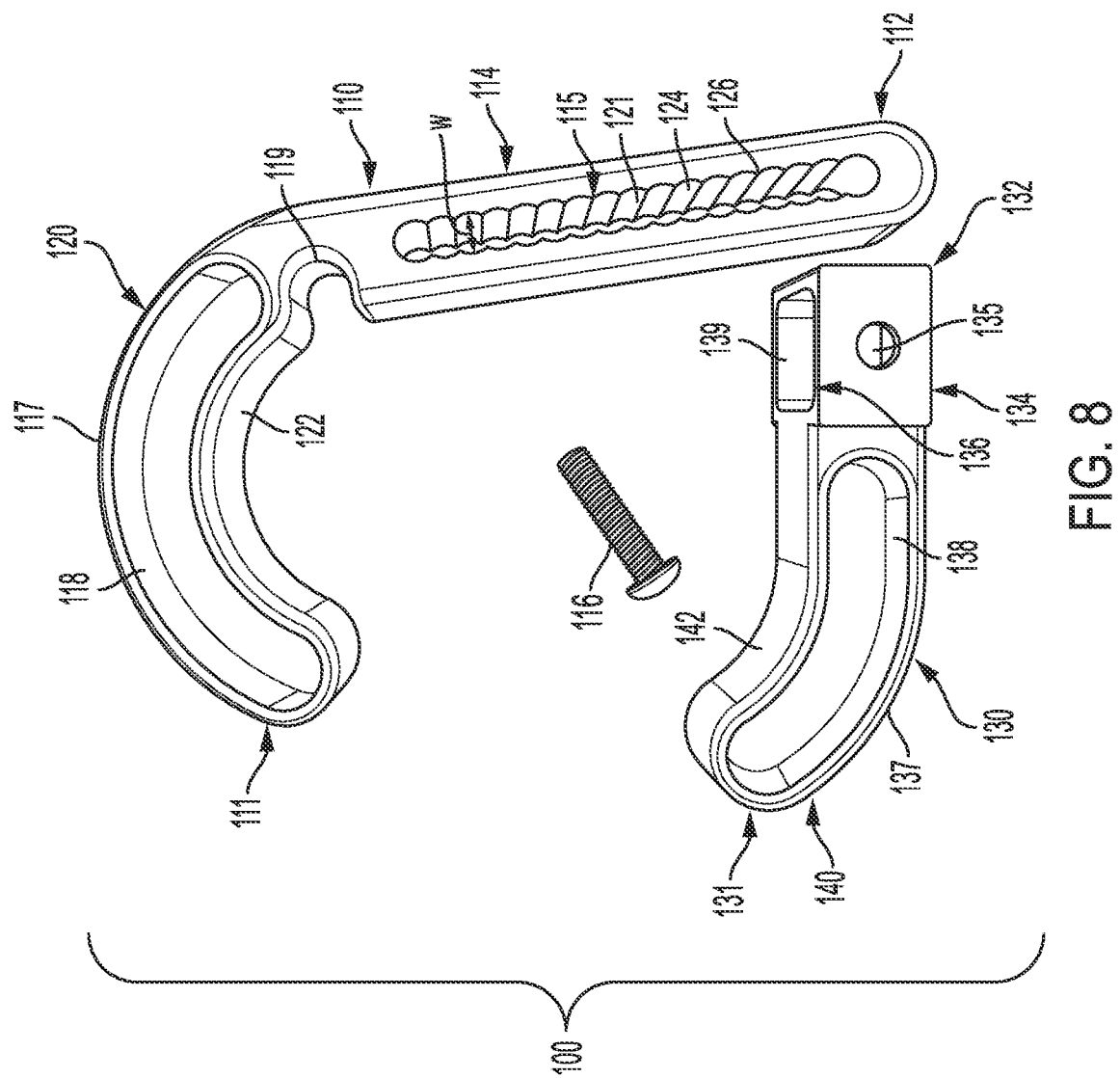
FIG. 8 illustrates an exploded view of an embodiment of the security element of the security system.
Figure 9:
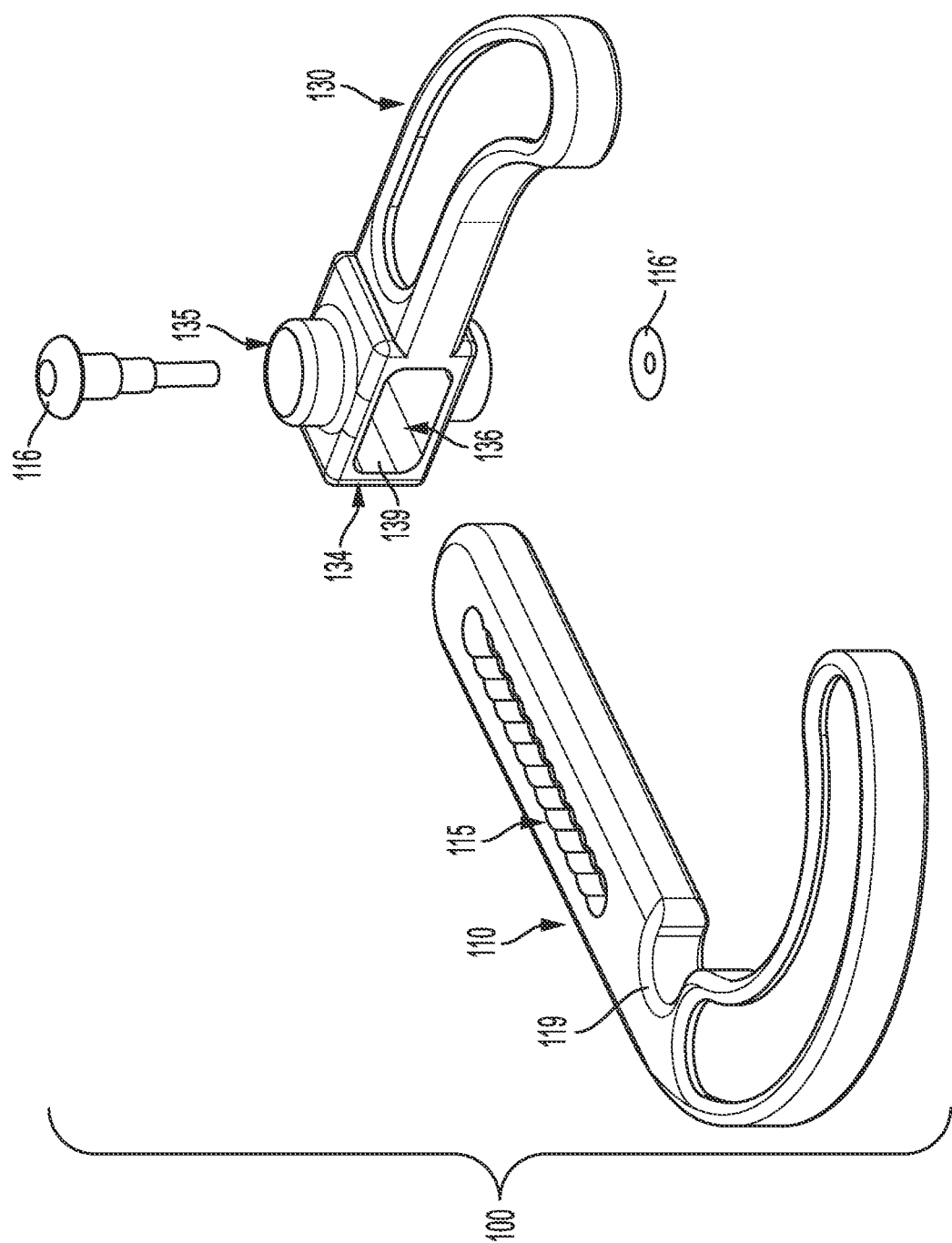
FIG. 9 illustrates an exploded view of an embodiment of the security element of the security system.
Figure 10:
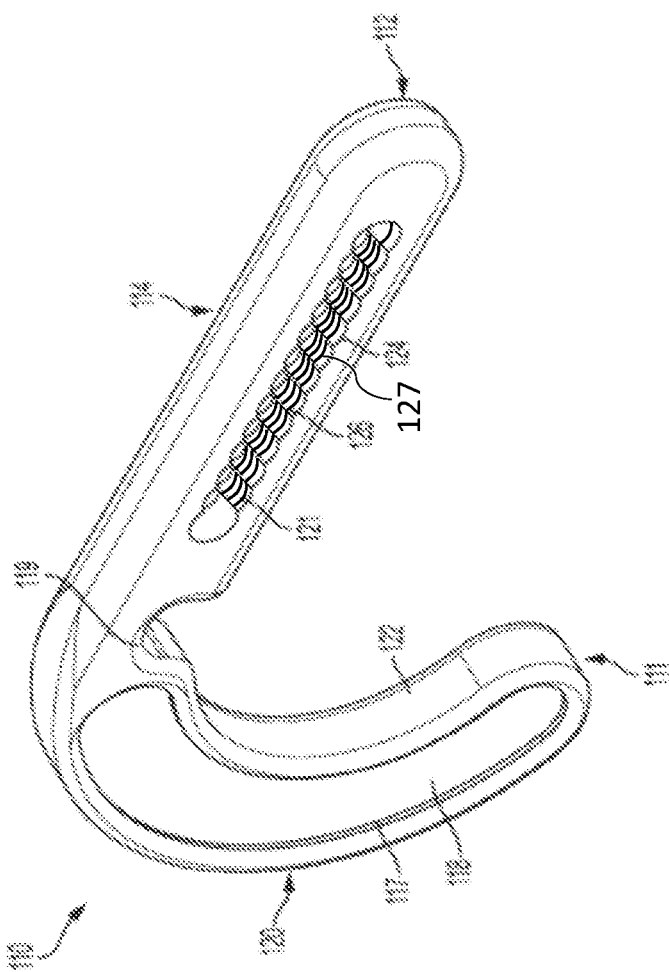
FIG. 10 illustrates a perspective view of an embodiment of a fixed member of the security element.

As shown in the figures, the fixed clamping surface 122 is curved or semi-circular in shape, however in other embodiments the fixed clamping surface may include one or more linear surfaces extending along a plane. One or more surface features may also be located on one or more sides 125 (FIGS. 4, and 7) of the clamping portion 120 of the fixed member 110. Referring to FIGS. 2-3, the clamping portion 120 of the fixed member 110 comprises a rim 117 that defines a groove 118 or an otherwise elongated depression that substantially follows the curved shape of the clamping portion 120.

Referring now to FIGS. 2-4, a coupling portion 114 is positioned proximate the second end 112 of the security element 100. As shown, the coupling portion 114 defines an opening 115 configured to at least partially receive the coupling element 116. In an embodiment, the opening 115 is a slot or an otherwise elongated opening that extends along the axis Y (FIG. 4) of the coupling portion and traverses the security element 100 thereby defining one or more interior surfaces 121. In the embodiments shown specifically in FIGS. 3, 6, 8, and 10, the interior surface 121 may be threaded 127 and/or may comprise a plurality of adjacent recesses 124, where the width W (FIG. 8) of the opening 115 increases between opposing recesses 124. Referring to FIGS. 2-6, 8-10, 14, and 16, either the coupling portion 114 or the clamping portion 120, or both may further comprise a notch 119 or other anchor engagement feature configured to engage or couple to one end or a portion of an anchor 200 (FIGS. 1, 14-16).

Referring to generally to FIGS. 2, 3, 6, 8, and 11-13, the adjustable member 130 of the security element 100 comprises a first end 131 and a second end 132. A securing or clamping portion 140 is positioned proximate the first end 131 and further comprises an adjustable clamping surface 142 or adjustable engagement surface. As shown, the adjustable clamping surface 142 is smooth, however in other embodiments the adjustable clamping surface 142 may include one or more surface features configured to improve gripping properties when the security element 100 is installed onto a piece of merchandise or other object 300. In still another embodiment, the adjustable clamping surface 142 may be at least partially coated with or otherwise covered with a material such as silicone, polyurethane gel, rubber, foam, or any other suitable material configured to improve gripping properties while protecting the object being secured from damage by the security element 100.

As shown in the figures, the adjustable clamping surface 142 is curved or semi-circular in shape, however in other embodiments the adjustable clamping surface 142 may include one or more linear surfaces extending along a plane. One or more surface features may be located on one or more sides 144 (FIG. 13) of the securing portion 140 of the adjustable member 130. As shown, the securing portion 140 of the adjustable member 130 comprises a rim 137 that defines a groove 138 or an otherwise elongated depression that substantially follows the curved shape of the securing portion 140.

Figure 11:
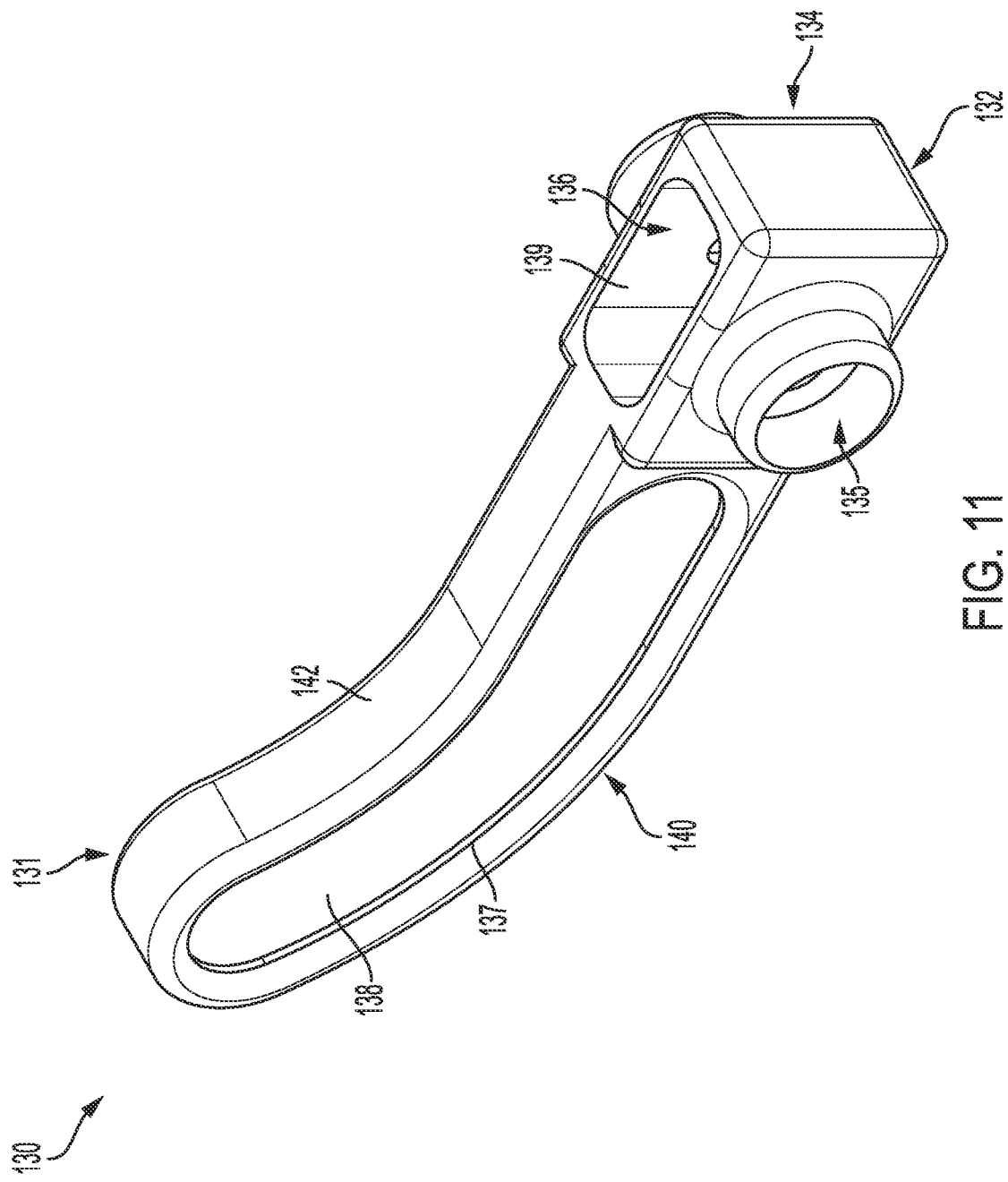
FIG. 11 illustrates a perspective view of an embodiment of an adjustable member of the security element.
Figure 12:
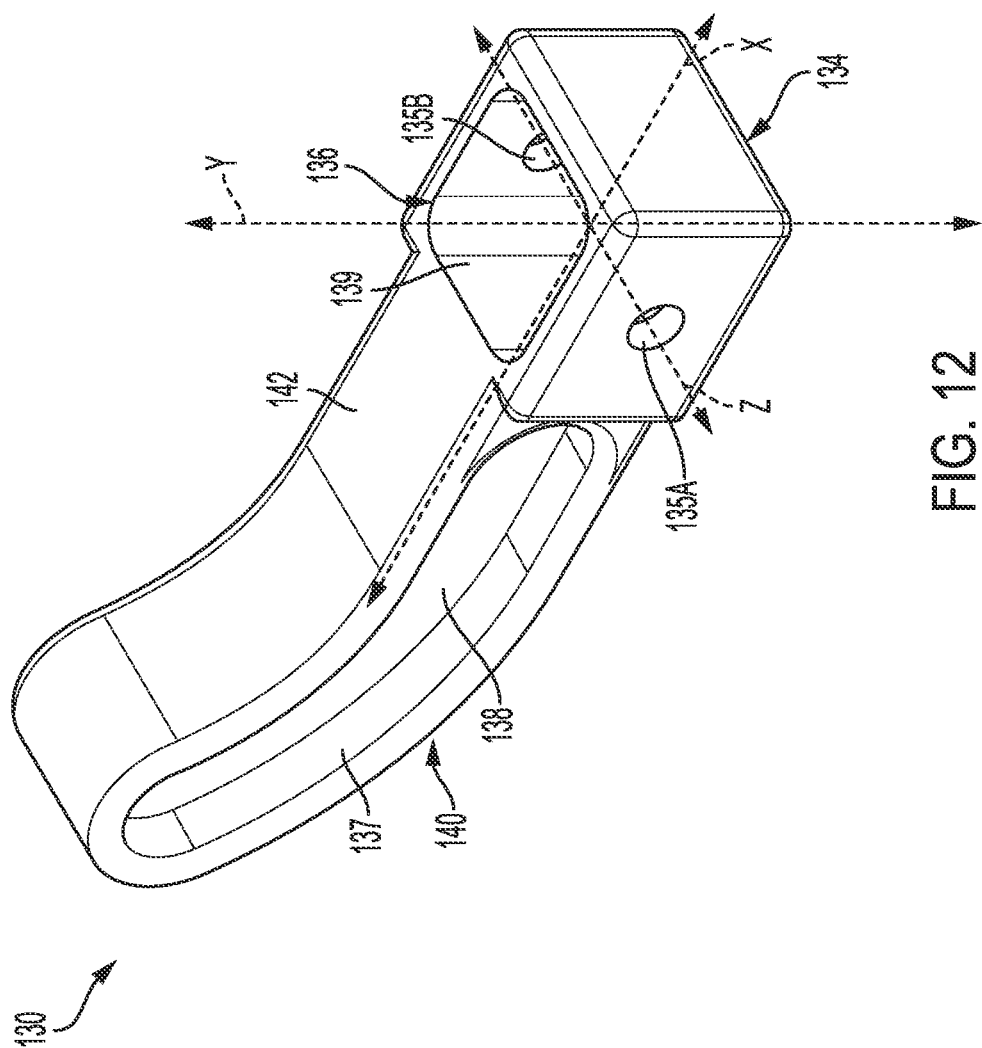
FIG. 12 illustrates a perspective view of an embodiment of the adjustable member of the security element.
Figure 13:
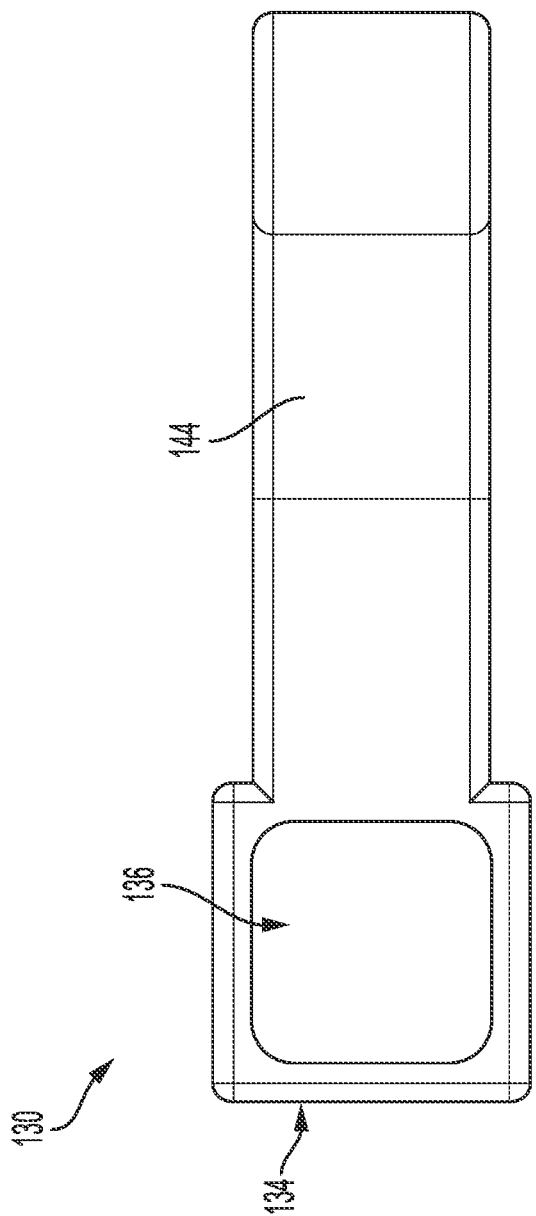
FIG. 13 illustrates a bottom view of an embodiment of the adjustable member of the security element.

The second end 132 of the adjustable member 130 comprises an engagement portion 134. Referring to FIGS. 11 and 12, the engagement portion 134 defines a bore or shaft 136 with one or more interior surfaces 139 which is configured to at least partially surround a portion of the coupling portion 114 of the fixed member 110. As shown, the one or more interior surfaces 139 are smooth, however in other embodiments they may comprise surface features configured to engage with the fixed member 110 and assist in coupling the adjustable member 130 to the fixed member 110. A first coupling element opening 135A and second coupling element opening 135B are positioned on opposing sides of the engagement portion 134. The coupling element 116 may be inserted through the first and second coupling element openings 135A, 135B and extend along an axis that is generally perpendicular to an axis Y of the shaft 136. Still referring to FIGS. 11 and 12, the shaft 136 generally extends along the axis Y and the coupling element 116 extending through the first and second coupling element opening 135A, 135B generally extends along the axis Z.

Referring to FIGS. 1, 4-6, in order to assemble the security element 100 and install it onto an object 300, the second end 112 of the fixed member 110 is inserted into the shaft 136 of the at least part of the coupling portion 114 of the fixed member 110 is inserted into the shaft 136 of the engagement portion 134 of the adjustable member 130. The fixed member 110 is inserted into the shaft 136 such that the opening 115 of the coupling portion 114 of the fixed member 110 is aligned with the first coupling element opening 135A and the second coupling element opening 135B. The adjustable member 130 is moved such that the securing portion 140 is brought toward the clamping portion 120 to trap the object 300 between the fixed clamping surface 122 and the adjustable clamping surface 142. The adjustable member 130 is configured to be extended as shown in FIG. 5A or retracted as shown in FIG. 5B in order to secure a variety of objects 300 of different sizes and shapes. The coupling element 116 is inserted through the first coupling element opening 135A, the opening 115, and the second coupling element opening 135B. The coupling element 116 contacts or is positioned within at least one of the plurality of recesses 124 defined on the interior surface 121 of the opening 115. In an embodiment, a barrier 126 is formed between adjacent recesses 124 that is configured to prevent the coupling element 116 from moving along the opening 115. Consequently, this prevents the adjustable member 130 from moving along the axis Y of the coupling portion 114 when the coupling element 116 traverses the opening 115. However, in another embodiment barrier 126 may still allow the adjustable member 130 to move along the coupling portion 114 when the coupling element 116 traverses the opening 115. In this embodiment, tightening of the securing member 116' (FIG. 7) prevents the adjustable member from moving relative to the fixed member 110.

The coupling element 116 may be secured by a pin, lock, backing, or other such securing member 116' (FIG. 7) such that only authorized personnel are able and equipped to release the coupling element 116. In an embodiment, the coupling element 116 may be self-locking. In another embodiment, the coupling element 116 may be a locking screw comprising a plurality of threads on its outer surface that are configured to engage complimentary threads 127 located on the interior surface 121 of the opening 115. The plurality of recesses 124 defined on the interior surface 121 may act to partially define a plurality of compartments within the opening 115. In this embodiment, the coupling element 116 is inserted into the first coupling element opening 135A and rotated to engage the threaded interior surface 121 of the opening 115. The locking screw is rotated until it secures the adjustable member 130 to the fixed member 110, and thereby securing the security element 100 to the object. Alternatively, a securing member 116' (FIG. 7) may further be coupled to the locking screw to prevent its removal and further secure the adjustable member 130 in a position relative to the fixed member 110.

Figure 6:
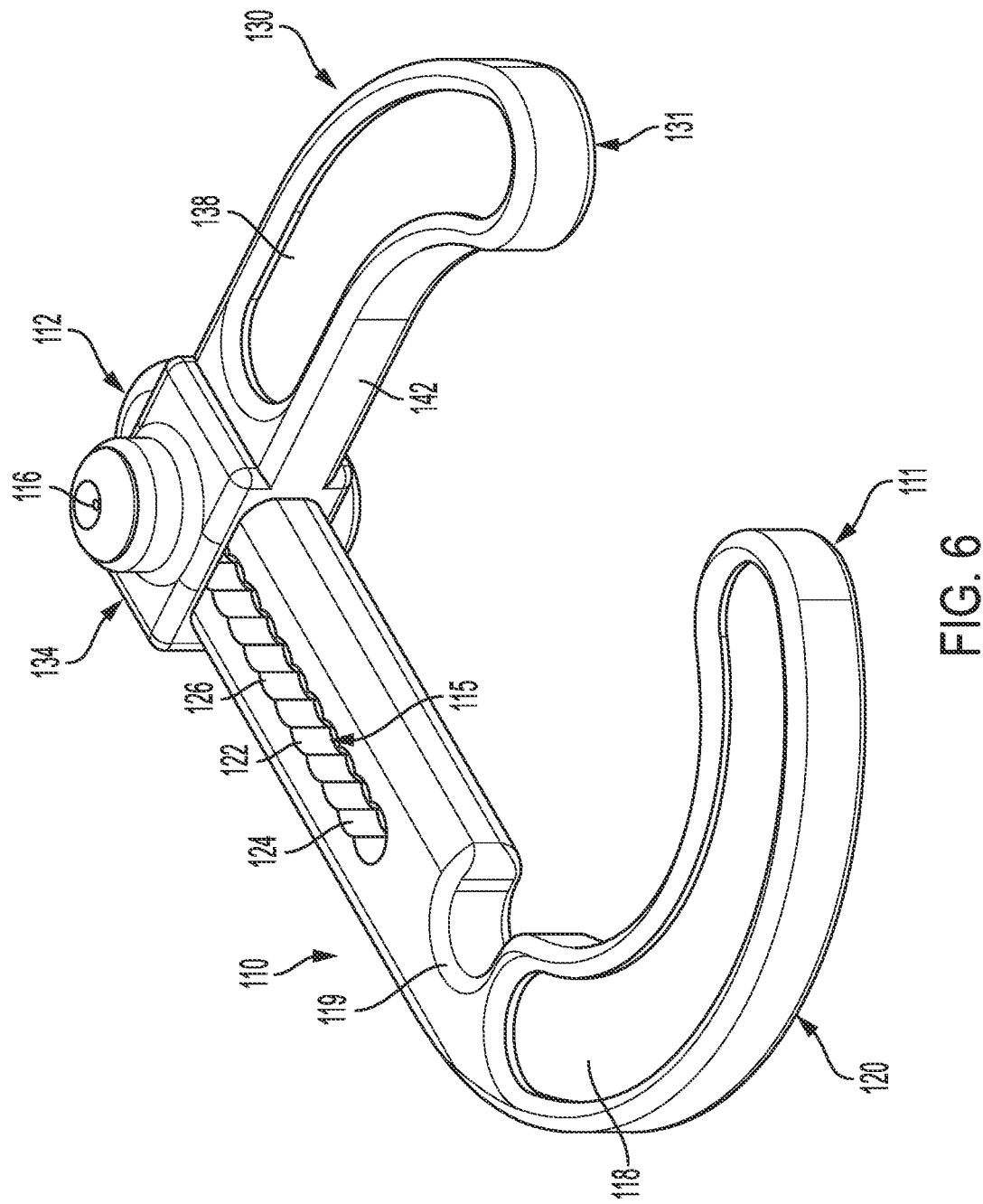
FIG. 6 illustrates a perspective view of a smaller embodiment of the security element of the security system in an expanded position.

In an embodiment shown in FIG. 6, the coupling element 116 cannot be disengaged from the adjustable member 130 and the fixed member 110, however the adjustable member 130 is still able to move relative to the fixed member 110 along the coupling portion 114. The coupling element 116 may then be adjusted to lock the adjustable member 130 such that it cannot move relative to the fixed member 110. Unlike a nut-and-bolt fastener, the coupling element 116 in this embodiment of the security system 10 cannot be unscrewed or otherwise backed out to decouple the adjustable member 130 from the fixed member 110. As a result, the adjustable member 130 and the fixed member 110 remain coupled together as a single unit at all times. In an embodiment, the coupling element 116 may be comprised of one or more components. For example, the coupling element 116 may comprise a bolt or post and a backing configured to engage an end of the bolt. In another embodiment, the coupling element 116 may further comprise a sleeve that is configured to surround or at least partially house the bolt. In an embodiment, the coupling element 116 is a fastener comprising two or more diameters.

Figure 14:
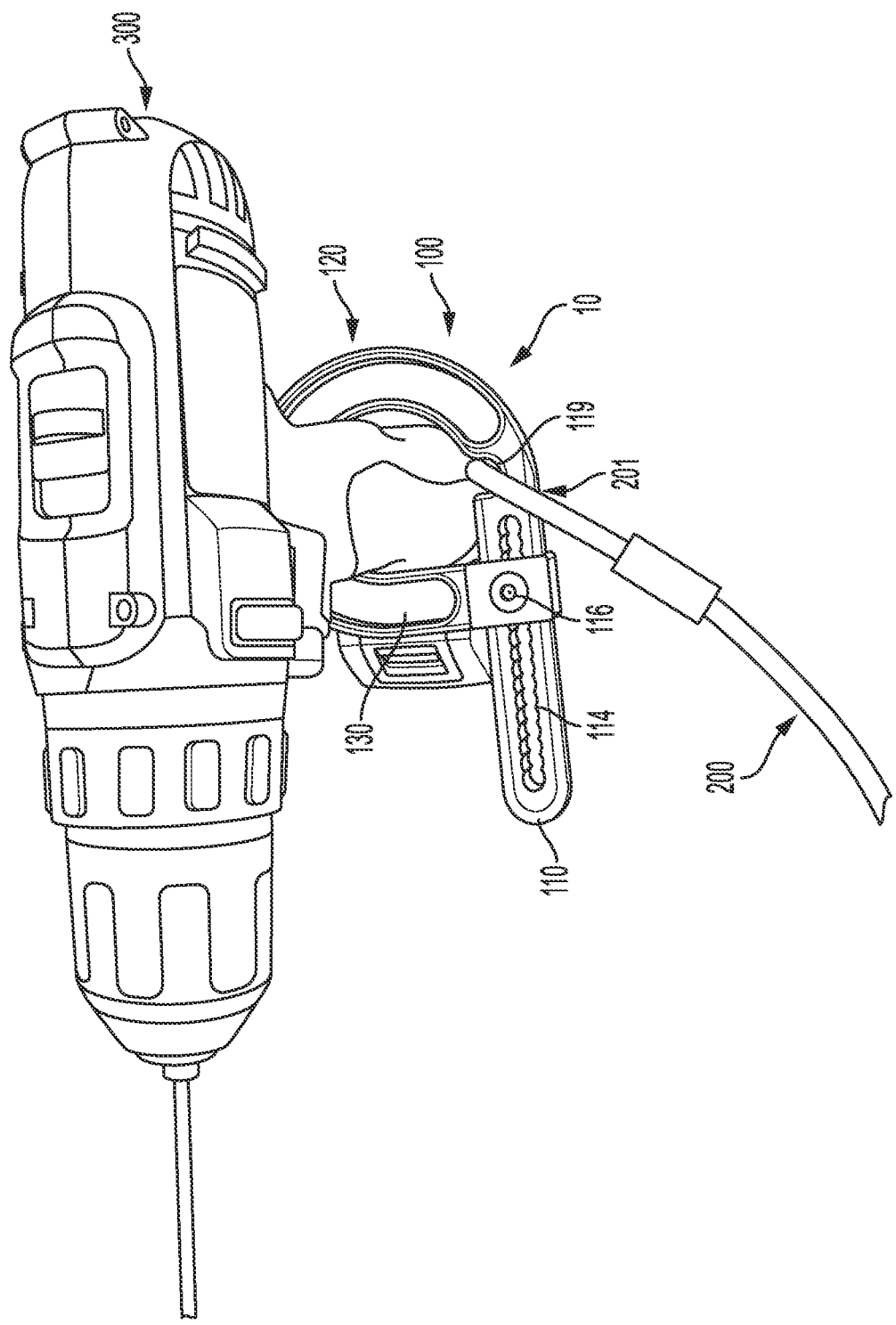
FIG. 14 illustrates a perspective view of an embodiment of the security system securing a power tool.
Figure 15:
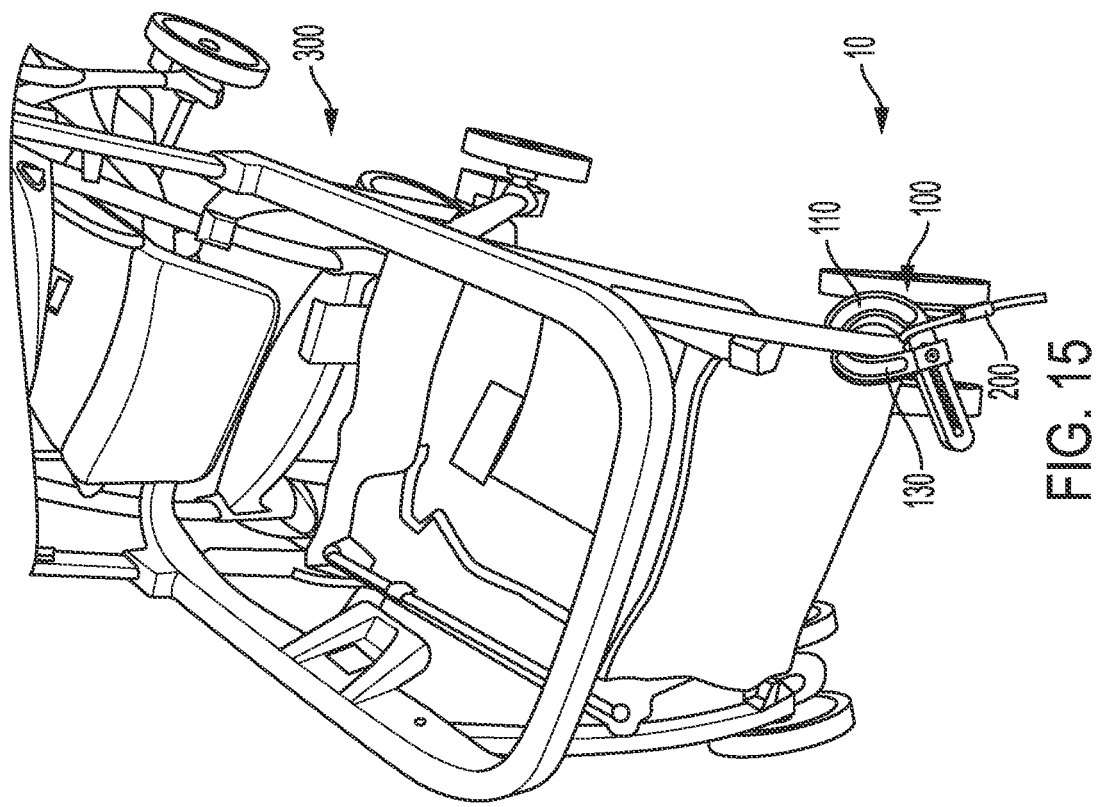
FIG. 15 illustrates a perspective view of an embodiment of the security system securing a stroller.
Figure 16:
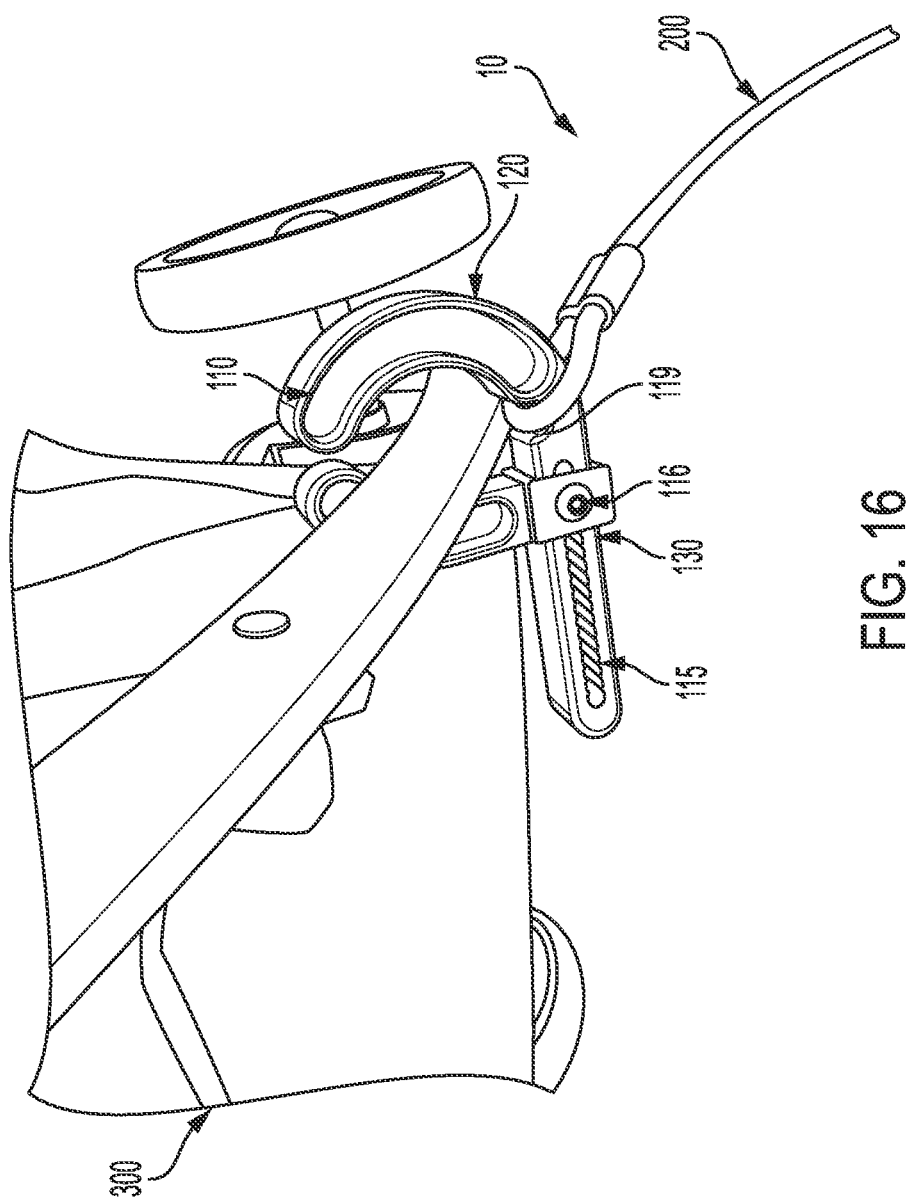
FIG. 16 illustrates a close up perspective view of the embodiment of the security system securing the stroller of FIG. 15.

As shown, the anchor 200 may be coupled to the security element 100 at the notch 119 at any point during assembly of the security element 100. In an embodiment, the anchor 200 (FIGS. 1, 14-16) may comprise a chain, nylon rope, wire, braded cable, or other suitable tether, lanyard, or the like. As shown in FIG. 14, one end of the anchor 200 forms a loop 201 or other coupling feature configured to engage the notch 119. In another embodiment, the anchor 200 may couple to the security element 100 via a bore defined in one of the fixed member 110 and the adjustable member 130. The length and size of the anchor 200 can vary in order to pair properly with security elements 100 of varying sizes and in order to properly secure objects of varying sizes. The opposing end of the anchor 200 may be secured to a fixed point such as the floor, wall, a fixture, or any other point stable and strong and enough to fixedly secure the opposing end of the anchor 200 and prevent theft of the security system 10 and the object 300 being secured.

In order to release the object from the security system 10, the coupling element 116 is disengaged from the opening 115. As shown, the coupling element 116 is a locking screw such that a key or other proprietary tool is required to disengage the locking screw from the interior surface 121 of the opening 115. The key or tool required to remove the locking screw may be proprietary.

Still referring to FIGS. 1 and 4-6, the proportions of the components comprising the security system 10 may be ideal for to properly secure the objects depicted, however on of ordinary skill would realize that one or more of said components may be increased or decreased in size to more effectively secure objects other than those shown in the figures. Accordingly, the security element 100 may be many different sizes to accommodate many different types and sizes of objects. For example, the security element 100 may be made in larger sizes in order to secure lawn tractors, televisions, bicycles and other such large objects. Alternatively, the security element 100 may be made in smaller sizes suitable for securing watches, rings, shoes, purses, and other such smaller objects.

One or more components of the security system 10 may be comprised of one or more types of metal, such as steel or aluminum, or one or more types of plastic, such as PA6 (Nylon 6), ABS (Acrylonitrile butadiene styrene), or POM (Polyoxymethylene). In an embodiment, one or more components of the security system 10 may be comprised of a combination of metallic and plastic components. In still another embodiment, one or more of the components of the security system 10 may comprise carbon fiber, a carbon fiber composite, or other composites that exhibit superior strength and durability, while being light-weight and cost-efficient. In other embodiments, the security system 10 may further comprise a coating such as plastic, rubber, silicone, or other polymeric coating that increase its durability, and creates a surface that is easier to grip.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security element comprising:
   a fixed member having a first end and a second end and comprising:
      a clamping portion proximate the first end and comprising a fixed engagement surface, and
      a coupling portion proximate the second end, the coupling portion defining a slot extending along a slot axis and traversing the coupling portion, wherein the slot comprises an interior surface comprising a plurality of adjacent recesses and a plurality of opposing recesses that each oppose a corresponding one of the plurality of adjacent recesses;
   an adjustable member having a first end and a second end and comprising:
      a securing portion proximate the first end and comprising an adjustable engagement surface, wherein the clamping portion and the securing portion face each other, and
      an engagement portion proximate the second end and configured to house a portion of the coupling portion of the fixed member, the engagement portion defining a first opening and a second opening; and
   a coupling element configured to extend between the first opening and the second opening and through the slot to couple the adjustable member to the fixed member, wherein the coupling element is configured to contact at least one of the plurality of adjacent recesses and at least one of the plurality of opposing recesses of the interior surface of the slot,
   wherein a space is defined between each of the plurality of adjacent recesses and each of the plurality of opposing recesses that is configured to accept a portion of the coupling element, wherein a first barrier is formed between adjacent ones of the plurality of adjacent recesses and a second barrier is formed between adjacent ones of the opposing recesses, such that the first and second barriers each partially protrude into the slot and are configured to prevent the coupling element from moving along the slot axis, and wherein a backing is configured to prevent removal of the coupling element while the coupling element traverses the first opening, second opening, and the slot, and
   wherein the plurality of recesses and the plurality of opposing recesses comprise a plurality of threads configured to engage a plurality of complementary threads on an exterior surface of the coupling element.

2. The security element of claim 1, wherein a locked state is defined when the adjustable member is prevented from moving relative to the fixed member and an unlocked state is defined when the adjustable member is enabled to move relative the fixed member.

3. The security element of claim 1, further comprising a notch configured to accept a portion of a tether.

4. The security element of claim 1, wherein at least one of the adjustable engagement surface and the fixed engagement surface comprises one or more surface features.

5. The security element of claim 1, wherein the coupling element is a threaded fastener.

6. A security element comprising:
   a fixed member having a first end and a second end, the fixed member comprising:

a clamping portion proximate the first end and comprising a fixed clamping surface, and a coupling portion proximate the second end and defining a slot traversing the coupling portion and extending along a slot axis, wherein the slot comprises an interior surface comprising a plurality of adjacent recesses and a plurality of opposing recesses that each oppose a corresponding one of the plurality of adjacent recesses;

an adjustable member having a first end and a second end, the adjustable member comprising:

a securing portion proximate the first end comprising an adjustable clamping surface, and an engagement portion proximate the second end, the engagement portion configured to house a portion of the coupling portion of the fixed member and further defining a first coupling opening and a second coupling opening; and a coupling element configured to extend between the first coupling opening, the second coupling opening, and the slot, wherein the coupling element is configured to be positioned within a space having a first diameter and defined by one of the plurality of adjacent recesses and a corresponding one of the plurality of opposing recesses of the interior surface of the slot, wherein the plurality of recesses and the plurality of opposing recesses comprise a plurality of threads configured to engage a plurality of complementary threads on an exterior surface of the coupling element.

7. The security element of claim 6, wherein a first barrier is formed between adjacent ones of the plurality of adjacent recesses and a second barrier is formed between ones of the plurality of opposing recesses, the first and second barriers are configured to partially protrude into the slot to define a second diameter, wherein the second diameter is less than the first diameter and structured to prevent the coupling element from moving along the slot axis.

8. The security element of claim 7, further comprising a backing configured to prevent removal of the coupling element from the first coupling opening, the second coupling opening, and the slot.

9. The security element of claim 6, wherein an unlocked state is defined where the adjustable member is enabled to move relative to the fixed member and a locked state defined where the adjustable member is prevented from moving relative to the fixed member.

10. The security element of claim 6, further comprising a coupling feature configured to accept a portion of an anchor.

11. The security element of claim 10, wherein the coupling feature is a notch.

12. The security element of claim 6, wherein at least one of the fixed clamping surface and the adjustable clamping surface comprises one or more surface features.

13. The security element of claim 6, wherein the coupling element is a locking bolt.

14. A security system comprising:

a security member comprising:

a fixed member defining a fixed clamping surface at a first end and a second end defining an elongated opening traversing the fixed member, the elongated opening bounded by an interior surface comprising a plurality of adjacent recesses, and a plurality of opposing recesses that each oppose a corresponding one of the plurality of adjacent recesses, wherein a space is defined between each of the plurality of adjacent recess and each corresponding opposing recess;

an adjustable member defining an adjustable clamping surface at a first end and a bore at a second end, wherein the second end of the fixed member is configured to be at least partially inserted into the bore of the adjustable member, and a coupling element configured to traverse the second end of the adjustable member and the elongated opening of the fixed member to couple the fixed member to the adjustable member, wherein the coupling element is configured to occupy one of the spaces; and an anchor configured to couple the security member to a fixed structure, wherein an unlocked state is defined when the adjustable member is able to move relative to the fixed member, and wherein a locked state is defined when the adjustable member is prevented from moving relative to the fixed member, wherein the plurality of recesses and the plurality of opposing recesses comprise a plurality of threads configured to engage a plurality of complementary threads on an exterior surface of the coupling element.

15. The security system of claim 14, further comprising a coupling feature configured to accept a portion of the anchor.

16. The security system of claim 15, wherein the coupling feature is a notch.

17. The security system of claim 14, wherein at least one of the fixed clamping surface and the adjustable clamping surface comprises one or more surface features.

18. The security system of claim 14, wherein the coupling element is configured to irremovably couple to the security member, wherein the coupling element is configured to be tightened to achieve the locked state and loosened to achieve the unlocked state.

19. The security system of claim 18, further comprising a backing configured to prevent removal of the coupling element from the second end of the adjustable member and the elongated opening.

* * * * *